INVENTOR.
Roger W. Johnson
BY
Hugh L. Fisher
ATTORNEY

United States Patent Office 3,338,808
Patented Aug. 29, 1967

3,338,808
METHOD AND APPARATUS FOR ELECTRICAL STOCK REMOVAL
Roger W. Johnson, Rochester, Mich., assignor to General Motors Corporation, Detroit, Mich., a corporation of Delaware
Filed Dec. 11, 1963, Ser. No. 329,699
7 Claims. (Cl. 204—143)

ABSTRACT OF THE DISCLOSURE

A cutting tool electrode that is constructed as a wheel with fluid passages arranged along the opposite sides thereof. Fluid under pressure is supplied to the passages and the alignment of the passages deflects the fluid flow so that rotational forces are imposed upon the electrode. The passages are also constructed and arranged to deliver fluid to a machining area defined by the periphery and sides of the electrode so that with power supplied to a gap maintained between the electrode and a conductive workpiece, stock is electrically removed from the workpiece.

---

This invention relates to improvements in method and apparatus for electrically removing stock from a conductive workpiece. The invention further concerns cutting tool electrode structures adapted, although not exclusively, for use with electrical stock removal apparatus.

The electrical stock removal processes, such as electrical discharge machining and electrochemical machining have been found useful in both grinding and slicing operations, particularly when the workpiece materials are extremely hard. Either or both of these grinding and slicing operations present special problems because they usually involve a rotating disk-type cutting tool electrode. Since the wheel-type electrode must be rotated, there is the added problem of drive connecting it to a drive motor while at the same time electrically connecting the cutting tool and workpiece electrodes to an electrical power supply. Related to the rotation of the cutting tool electrode is the problem of distributing the machining fluid, whether it is an electrolyte or a dielectric fluid. The machining area must have this fluid at all times for the machining process to continue efficiently.

With the foregoing in mind, novel method and apparatus are proposed wherein the cutting tool electrode is, in effect, self driven and that efficiently distributes a machining fluid within the machining areas.

There is also proposed a unique electrode structure with machining fluid passages so arranged that the machining fluid flowing through these passages induces rotational movement of the wheel. This rotational movement facilitates the distribution of machining fluid to the machining areas.

The foregoing and other objects and advantages of the invention will be apparent from the following description and from the accompanying drawings, in which.

Figure 1:
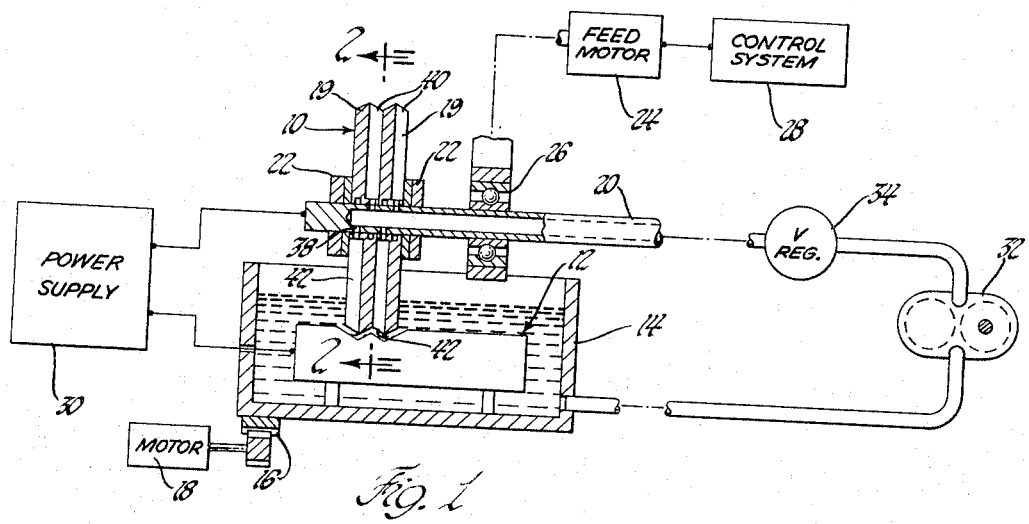
FIGURE 1 is a schematic diagram of apparatus incorporating the principles of the invention.

Referring now to the drawings in detail and initially to FIGURE 1, the numerals 10 and 12 denote a pair of electrodes, which will hereinafter be referred to respectively as the cutting tool and the workpiece. The workpiece 12 is fixedly mounted within and insulated from a tank 14 containing a machining fluid. This tank 14 may be moved fore and aft by the agency of a rack and pinion, shown generally at 16, and a motor 18. The cutting tool 10 is wheel-like and may comprise a series of identical sections 19, all supported in any suitable way on a hollow and rotatable shaft 20. If preferred, the shaft 20 can be maintained stationary and the tool 10 rotated thereon. The axial position of the cutting tool 10 is established by retaining spacers 22. The spacing of the cutting tool 10 relative to the workpiece 12 is the function of a feed motor 24. The feed motor 24 has a bearing connection at 26 with the shaft 20 such that the cutting tool 10 can be moved in a gap closing or a gap reducing direction, as determined by a suitable control system 28 for the feed motor 24. Material is removed from the surface of the workpiece 12 as soon as the proper gap spacing is established and electrical power is supplied to the gap by a power supply 30 connected as illustrated in FIGURE 1. Of course, the shaft 20 must be electrically isolated in any appropriate way.

If the material is to be removed from the workpiece 12 by the electrochemical machining process, the machining fluid will be an electrolyte and the power supply will be of a type that supplies a direct current to the gap. This direct current will flow through the electrolyte and by the resultant continuous discharge causes the material to be electrochemically removed from the surface of the workpiece 12 with a configuration conforming to that of the periphery of the cutting tool 10. Reference is made to United States Patent No. 3,228,863, issued Jan. 11, 1966, to Glenn E. Wanttaja et al., and entitled "Electrolytic Process and Apparatus for Removing Stock From a Conductive Workpiece," and entitled, "Electrical Stock Removal Apparatus," for a disclosure relative to the motor 24 and the control system 28 and how to adapt for use with the electrochemical process. On the other hand, if the electrical discharge machining process is to be employed, the machining fluid will be some suitable dielectric and the power supply 30 will supply a pulsating current to the gap. Consequently, intermittent discharges will occur across the gap and cause the material to be eroded from the workpieces 12. In carrying out the electrical discharge machining process, the feed motor 24 and the control system 28 may be of the character described in the patent to Colten et al. 3,059,150.

The machining fluid is supplied to the shaft 20 by a suitable pump 32 whose inlet communicates with the tank 14 and whose outlet is connected to the shaft 20 at a point upstream from the pump 32. The outlet of the pump 32 also includes a conventional pressure regulator 34 that adjustably establishes whatever pressure is wanted for the system.

Figure 2:
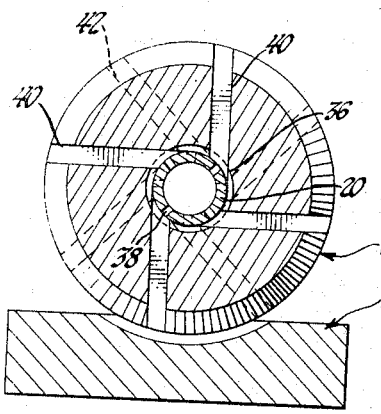
FIGURE 2 is a sectional view of the FIGURE 1 cutting tool electrode, taken along line 2—2 of FIGURE 1.

The FIGURE 1 cutting tool 10, as shown in FIGURE 2, has annular grooves 36 in sections 19 aligned with openings 38 in the shaft 20. The cutting tool 10 has outwardly extending and what will be termed as radially offset from the axis thereof a series of passages or grooves 40 and 42 equally spaced and alternately arranged in the opposite faces of the cutting tool 10. For explanatory purposes, the grooves on the right side, as viewed in FIGURE 1, have been assigned the numerals 40 and the grooves on the left side the numerals 42. This equal spacing and additionally interspacing, i.e. between two equal spaced grooves 40 in one face there is a groove 42 in the opposite face, promotes more stable rotational operation of the cutting tool 10.

In operation, the machining fluid delivered by the pump 32 through the center of the shaft 20 passes through the openings 38 and the annular grooves 36 and into the grooves 40 and 42. The fluid then proceeds outwardly and to the gap area. In traversing this path the machining fluid will develop rotational forces, which will be applied to the cutting tool 10 and cause it to revolve. These rotational forces will be determined by the radial offset, which in this embodiment is the radius of the shaft 20, the unit pressure of the incoming machining fluid and the cross-sectional area of the grooves 40 and 42. The rotational speed of the cutting tool 10 can easily be regulated by adjusting the pressure regulator 34 in any conventional way, or if preferred the pressure regulator 34 can be eliminated and the speed of the pump 32 controlled.

With the grooves 40 and 42 open and arranged as illustrated, the efficient distribution of the machining fluid to the work area is assured by the rotation of the cutting tool 10. This affords a further benefit because it eliminates the need for special structures to properly distribute the fluid.

Figure 3:
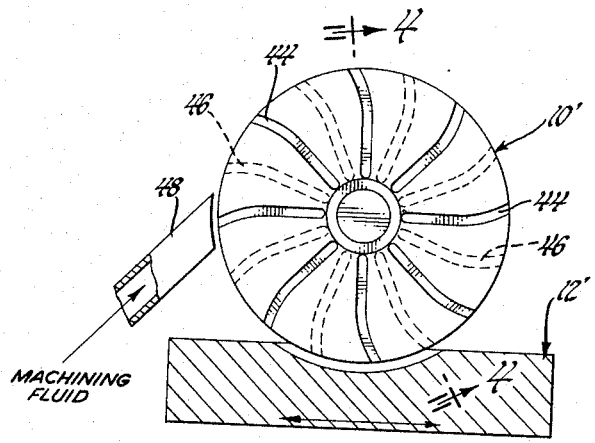
FIGURE 3 is a view of a modified cutting tool electrode.

In the FIGURE 3 apparatus the modified cutting wheel 10' is provided with passages or grooves 44 in one face equally, angularly spaced that extend radially and arcuately outwardly from the rotational axis of the cutting tool 10'. Similar passages or grooves 46 in the other face are provided except that the grooves 46 are spaced in between the grooves 44, as viewed in FIGURE 3.

In this FIGURE 3 arrangement, machining fluid is delivered to the periphery of the cutting tool 10 by a discharge tube 48. The discharge tube 48 may communicate with the outlet of a pump, such as the pump 32 in FIGURE 1. This machining fluid, in exiting from the discharge tube 48, will flow in the grooves 44 and 46 and, as with the FIGURE 1 apparatus, induce rotational forces that will cause the cutting tool 10' to rotate clockwise, as viewed in FIGURE 3. This fluid will, of course, be distributed along the sides or faces of the cutting tool 10' and also to the periphery so as to at all times be present within the machining area defined by the adjacent surfaces of the cutting tool 10' and the workpiece 12'.

Figure 4:
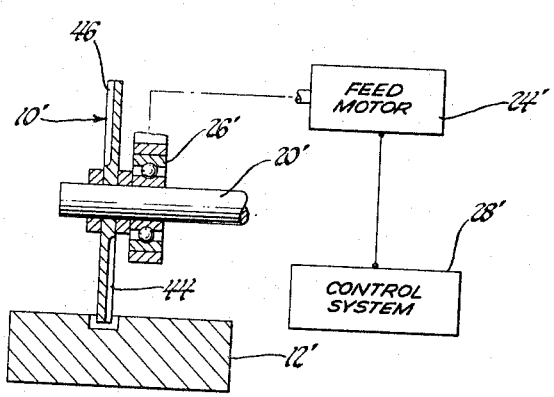
FIGURE 4 is a sectional view of the FIGURE 3 cutting tool electrode, taken along line 4—4 of FIGURE 3, and also shows schematically a control system for maintaining gap spacing.

Feeding of the cutting tool 10' relative to the workpiece 12' can be accomplished in the same way as that in FIGURE 1; namely, as shown in FIGURE 4, by a feed motor 24' having a bearing connection at 26' with a shaft 20 that supports the cutting tool 10'. A control system 28' can be used to control the feed motor 24 and provide the desired gap spacing.

From the foregoing it will be appreciated that a very efficient way of either grinding the surface of a workpiece or slicing through a workpiece is provided, utilizing a unique wheel-like cutting tool that is self-propelled in such a way that the machining fluid is effectively delivered to the machining area at all times. This reduces the complexity of this type of apparatus as well as renders the apparatus quite inexpensive and without the need for a separate motor to rotate the cutting tool.

The invention is to be limited only by the following claims.

What is claimed is:

1. In electrical stock removal apparatus, the combination of conductive cutting tool and workpiece electrodes spaced apart so as to form a machining gap therebetween, a source of electrical power connected across the gap so as to produce electrical stock removing discharges thereacross, means supplying machining fluid under pressure, the cutting tool being rotatably mounted and having passages therein so arranged as to communicate with the supplying means, the passages being so arranged that incoming machining fluid under pressure is deflected thereby in flowing therethrough to the gap, whereby the machining fluid contributes substantially all of the driving force for causing rotational movement of the cutting tool electrode relative to the workpiece electrode.

2. In electrical stock removal apparatus, the combination of conductive cutting tool and workpiece electrodes spaced apart so as to form a machining gap therebetween, a source of electrical power connected across the gap so as to produce electrical stock removing discharges thereacross, means supplying machining fluid under pressure, the cutting tool electrode having a rotatably mounted annular body having a hub portion communicating with the source and a series of circumferentially spaced passages in each of the opposite faces of the annular body extending inwardly to the hub portion and in communication with the source of machining fluid, the passages being radially offset relative to the rotational axis of the body so that the machining fluid under pressure from the supplying means in flowing therethrough to the gap is deflected to thereby develop rotation inducing forces that are applied to the body and cause rotation thereof.

3. In electrical stock removal apparatus, the combination of conductive cutting tool and workpiece electrodes spaced apart so as to form a machining gap therebetween, a source of electrical power connected across the gap so as to produce electrical stock discharges thereacross, means supplying machining fluid under pressure, the cutting tool electrode having a wheel-like body provided with a hub portion in communication with the source of machining fluid, the body having a series of circumferentialy equispaced grooves alternately provided in the opposing faces of the wheel, the grooves extending inwardly to the hub portion and in communication with the supplying means and being radially offset relative to the rotational axis of the body, the grooves deflecting the fluid under pressure from the hub portion flowing therethrough to thereby induce rotational forces that cause the wheel to rotate and thereafter delivering the fluid under pressure to the machining area between the cutting tool and the workpiece electrodes.

4. In electrical stock removal apparatus, the combination of conductive cutting tool and workpiece electrodes spaced apart so as to form a machining gap therebetween, a source of electrical power connected across the gap so as to produce electrical stock removing discharges thereacross, means supplying machining fluid under pressure, the cutting tool electrode being rotatably mounted and in the form of a wheel having a series of circumferentially equispaced grooves alternately provided in the opposite faces, the grooves being arcuate in configuration and extending radially inwardly, the supplying means including a nozzle arranged so as to discharge at the periphery of the wheel such that the machining fluid under pressure will be delivered to the grooves and together with the arcuate shape of the grooves the entering machining fluid will be deflected so as to induce rotational forces for causing the cutting tool electrode to rotate and in rotating also cause the machining fluid to be delivered to the machining area defined by the faces and periphery of the cutting tool electrodes.

5. The method of electrically removing stock from a conductive workpiece comprising supplying a machining fluid under pressure to a cutting wheel electrode having fluid receiving passages along the faces thereof so arranged that the fluid flowing therein is deflected to thereby develop rotation inducing forces for causing the cutting tool electrode to revolve relative to the workpiece and also the fluid is delivered to a machining area defined by the faces and periphery of the cutting wheel electrode, maneuvering the cutting wheel and the workpiece electrodes relative to each other so as to maintain a certain gap relationship therebetween and permit the fluid delivered to the machining area to bridge the gap, and supplying electrical energy to the gap so as to produce an electrical stock removal discharge thereacross.

6. The method of electrically removing stock from a conductive workpiece comprising the steps of supplying a machining fluid under pressure to the periphery of a rotatably mounted cutting wheel electrode having fluid receiving passages in the faces thereof so arranged that the fluid flowing within the passages is deflected so as to generate forces for rotating the cutting wheel electrode and also the fluid is delivered to a machining area defined by the faces and periphery of the cutting wheel electrode, maneuvering the electrodes relative to each other so as to maintain a certain gap relationship and permit the fluid delivered to the machining area to bridge the gap, and supplying electrical energy to the gap so as to produce an electrical stock removing discharge thereacross.

7. The method of electrically removing stock from a conductive workpiece comprising the steps of supplying a machining fluid under pressure to the hub of a rotatably mounted cutting wheel electrode having fluid receiving passages in the faces thereof extending outwardly from the hub to the periphery, the passage being alternately spaced in the opposite faces arranged so that the fluid within the passages is deflected thereby to generate forces for producing rotation of the cutting wheel electrode, maintaining a certain gap relationship between the cutting wheel and the workpiece while flowing machining fluid through the gap, and supplying electrical energy to the gap so as to produce an electrical stock removal discharge thereacross.

References Cited

UNITED STATES PATENTS

| | | | |
|---|---|---|---|
| 1,856,631 | 5/1932 | Hackenberg | 51—134.5 |
| 2,798,846 | 7/1957 | Comstock | 204—143 |
| 2,815,435 | 12/1957 | Adcock | 219—69 |
| 3,144,739 | 8/1964 | Brutvan et al. | 51—267 |

JOHN H. MACK, *Primary Examiner.*

HOWARD S. WILLIAMS, *Examiner.*

R. K. MIHALEK, *Assistant Examiner.*